United States Patent
Horiba et al.

(10) Patent No.: US 11,685,407 B2
(45) Date of Patent: Jun. 27, 2023

(54) VEHICLE AND CONTROL APPARATUS AND CONTROL METHOD OF THE SAME

(71) Applicant: HONDA MOTOR CO., LTD., Tokyo (JP)

(72) Inventors: Ayumu Horiba, Wako (JP); Tadahiko Kanoh, Wako (JP); Katsuya Yashiro, Wako (JP); Chihiro Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 547 days.

(21) Appl. No.: 16/986,912

(22) Filed: Aug. 6, 2020

(65) Prior Publication Data
US 2021/0053588 A1 Feb. 25, 2021

(30) Foreign Application Priority Data
Aug. 22, 2019 (JP) .............................. JP2019-152158

(51) Int. Cl.
*B60W 60/00* (2020.01)
*B60W 40/08* (2012.01)
(Continued)

(52) U.S. Cl.
CPC .......... *B60W 60/005* (2020.02); *B60W 10/20* (2013.01); *B60W 30/143* (2013.01);
(Continued)

(58) Field of Classification Search
CPC .. B60W 60/005; B60W 10/20; B60W 30/143; B60W 40/08; B60W 40/105;
(Continued)

(56) References Cited

U.S. PATENT DOCUMENTS 10,730,522 B2  8/2020  Uejima
10,832,576 B2  11/2020  Hiramatsu et al.
(Continued)

FOREIGN PATENT DOCUMENTS

JP  2009-090810 A  4/2009
JP  2018134962 A  8/2018
(Continued)

OTHER PUBLICATIONS

Japanese Office Action (with partial translation) for Japanese Patent Application No. 2019-152158 dated Apr. 26, 2021.

*Primary Examiner* — Nadeem Odeh
(74) *Attorney, Agent, or Firm* — Thomas | Horstemeyer, LLP

(57) ABSTRACT

A control apparatus of a vehicle includes a selection unit configured to select one of a plurality of travel states which have different automation rates from each other, a storage unit configured to store an upper limit travel speed of each of the plurality of travel states, and a changing unit configured to change, based on at least one of an operation by a driver and/or information of the driver, an upper limit travel speed of a travel state which is currently selected by the selection unit. The changing unit changes, in accordance with the change in the upper limit travel speed of the travel state which is currently selected, an upper limit travel speed of a travel state which is not currently selected among the plurality of travel states.

19 Claims, 5 Drawing Sheets

(51) Int. Cl.
  *B60W 10/20* (2006.01)
  *B60W 30/14* (2006.01)
  *B60W 40/105* (2012.01)
  *B60W 10/18* (2012.01)

(52) U.S. Cl.
  CPC .......... *B60W 40/08* (2013.01); *B60W 40/105* (2013.01); *B60W 60/001* (2020.02); *B60W 10/18* (2013.01); *B60W 2540/10* (2013.01); *B60W 2540/12* (2013.01); *B60W 2540/223* (2020.02); *B60W 2555/00* (2020.02)

(58) Field of Classification Search
  CPC ............... B60W 60/001; B60W 10/18; B60W 2540/10; B60W 2540/12; B60W 2540/223; B60W 2555/00; B60W 50/087; B60W 30/146
  See application file for complete search history.

(56) References Cited

U.S. PATENT DOCUMENTS

| | | | |
|---|---|---|---|
| 10,967,877 | B2 | 4/2021 | Asakura et al. |
| 11,021,156 | B2 | 6/2021 | Uejima |
| 2019/0106118 | A1 | 4/2019 | Asakura et al. |
| 2019/0126927 | A1 | 5/2019 | Uejima |
| 2019/0295417 | A1 | 9/2019 | Hiramatsu et al. |
| 2020/0064839 | A1* | 2/2020 | Oyama ........... B60W 60/00186 |
| 2020/0317228 | A1* | 10/2020 | Otake ................. B60W 60/005 |
| 2020/0324776 | A1 | 10/2020 | Uejima |
| 2021/0237762 | A1* | 8/2021 | Kuenzner .............. B60K 37/06 |

FOREIGN PATENT DOCUMENTS

| | | |
|---|---|---|
| JP | 2019-084885 A | 6/2019 |
| WO | 2017/179193 A1 | 10/2017 |
| WO | 2017/203691 A1 | 11/2017 |

* cited by examiner

F I G. 5

Table 500:

| | UPPER LIMIT SPEED OF ON-DUTY STATE [kph] 501 | UPPER LIMIT SPEED OF OFF-DUTY STATE [kph] 502 |
|---|---|---|
| NORMAL SETTING VALUE | 100 | 60 |
| SETTING VALUE BASED ON DRIVER | 80 OR MORE TO LESS THAN 100 | 60 |
| | 50 OR MORE TO LESS THAN 80 | 50 |
| | | 40 |

F I G. 6

Table 600:

| | UPPER LIMIT SPEED OF OFF-DUTY STATE [kph] 601 | UPPER LIMIT SPEED OF ON-DUTY STATE [kph] 602 |
|---|---|---|
| NORMAL SETTING VALUE | 60 | 100 |
| SETTING VALUE BASED ON DRIVER | 50 OR MORE TO LESS THAN 60 | 100 |
| | 40 OR MORE TO LESS THAN 50 | 90 |
| | | 70 |

VEHICLE AND CONTROL APPARATUS AND CONTROL METHOD OF THE SAME

CROSS-REFERENCE TO RELATED APPLICATIONS

This application claims priority to and the benefit of Japanese Patent Application No. 2019-152158 filed on Aug. 22, 2019, the entire disclosure of which is incorporated herein by reference.

BACKGROUND OF THE INVENTION

Field of the Invention

The present invention relates to a vehicle and a control apparatus and a control method of the vehicle.

Description of the Related Art

Various kinds of techniques have been developed for automated driving of a vehicle. Japanese Patent Laid-Open No. 2018-134962 discloses a technique in which the allowable upper limit value of speed of a vehicle is set based on an estimated value of visually recognizable distance of a driver so that the driver can receive driving support at ease even when the state of visibility is unfavorable.

In the technique disclosed in Japanese Patent Laid-Open NO. 2018-134962, the allowable upper limit value of the speed of the vehicle is set in accordance with the favorableness or unfavorableness of the visibility. However, even in a case in which the visibility is favorable, the normal upper limit travel speed of the vehicle during automated traveling may feel high depending on the driver and make him/her feel anxious.

SUMMARY OF THE INVENTION

One aspect of the present invention is to reduce the anxiety felt by a driver of a vehicle which is traveling by automated driving. According to some of the embodiments; a control apparatus of a vehicle, the apparatus comprising: a selection unit configured to select one of a plurality of travel states which have different automation rates from each other; a storage unit configured to store an upper limit travel speed of each of the plurality of travel states; and a changing unit configured to change, based on at least one of an operation by a driver and/or information of the driver, an upper limit travel speed of a travel state which is currently selected by the selection unit, wherein the changing unit changes; in accordance with the change in the upper limit travel speed of the travel state which is currently selected, an upper limit travel speed of a travel state which is not currently selected among the plurality of travel states is provided.

BRIEF DESCRIPTION OF THE DRAWINGS

FIG. 5 is a view for explaining an example of a reference table used by the control apparatus of the vehicle according to the embodiment;

FIG. 6 is a view for explaining an example of a reference table used by the control apparatus of the vehicle according to the embodiment;

DESCRIPTION OF THE EMBODIMENTS

Figure 1:
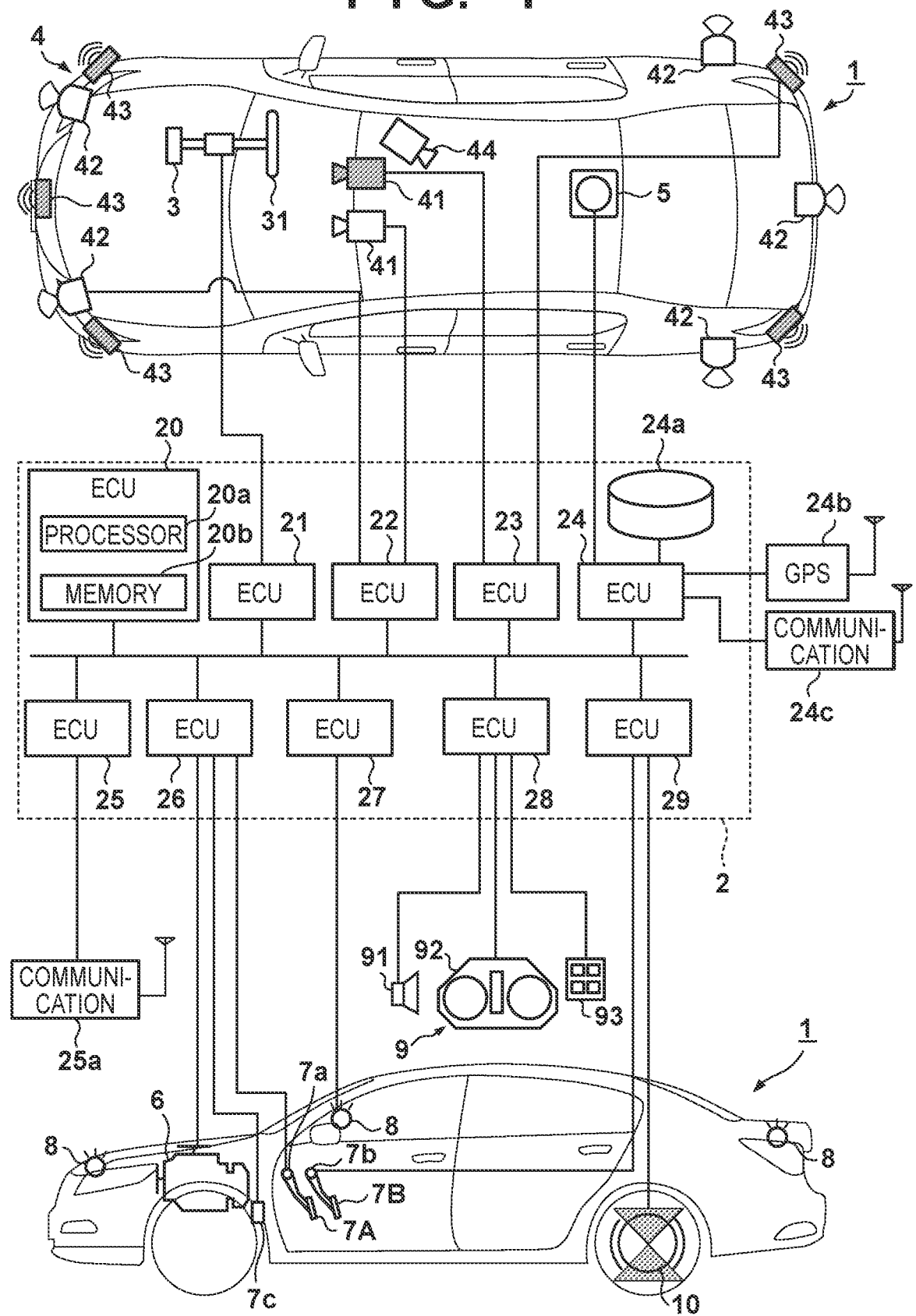
FIG. 1 is a block diagram for explaining an example of the arrangement of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle 1 according to an embodiment of this disclosure. FIG. 1 shows the outline of the vehicle 1 by a plan view and a side view. The vehicle 1 is, for example, a sedan-type four-wheeled vehicle. The vehicle 1 may be such a four-wheeled vehicle, a two-wheeled vehicle, or another type of vehicle.

The vehicle 1 includes a vehicle control apparatus 2 (to be simply referred to as the control apparatus 2 hereinafter) that controls the vehicle 1. The control apparatus 2 includes a plurality of ECUs 20 to 29 communicably connected by an in-vehicle network. Each ECU functions as a computer which includes a processor represented by a CPU, a memory such as a semiconductor memory, an interface with an external device, and the like. The memory stores programs to be executed by the processor, data to be used by the processor for processing, and the like. Each ECU may include a plurality of processors, memories, and interfaces. For example, the ECU 20 includes a processor 20a and a memory 20b. Processing by the ECU 20 is executed by the processor 20a executing an instruction included in a program stored in the memory 20h. Alternatively, the ECU 20 may include a dedicated integrated circuit such as an ASIC or the like to execute processing by the ECU 20. Other ECUs may be arranged in a similar manner.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering control and/or speed control (acceleration/deceleration control) of the vehicle 1 is automatically performed. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) performed on a steering wheel 31 by a driver of the vehicle 1. The driver of the vehicle 1 is an occupant sitting at the driver's seat of the vehicle 1, and whether this occupant is actually performing a driving operation does not matter. The driver of the vehicle 1 will be simply referred to as the driver hereinafter. The electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle, and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front portion of the roof of the vehicle 1. When images captured by the cameras 41 are analyzed, the contour of a target or a division line (a white line or the like) of a lane on a road can be extracted.

The detection unit 42 is a LiDAR (Light Detection and Ranging) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion; and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally. Furthermore, the vehicle 1 may also include a camera 44 that captures an image inside the vehicle (particularly, an image of the driver). The ECU 22 can specify the expression and the attributes of the driver based on an image obtained from the camera 44.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination. The ECU 24, the map information database 24a, and the GPS sensor 24b form a so-called navigation device.

The ECU 25 includes a communication device 25a for inter-vehicle communication. The communication device 25a performs wireless communication with another vehicle in the periphery and exchanges information between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. An input device 93 is a switch group that is arranged in a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stopping of the vehicle 1. The brake device 10 or the parking brake can also be operated to maintain the stopped state of the vehicle 1. In addition, if the transmission of the power plant 6 includes a parking lock mechanism, it can be operated to maintain the stopped state of the vehicle 1.

During the execution of automated travel control of the vehicle 1, the control apparatus 2 can select one travel state from a plurality of travel states based on external environment information such as the state of the periphery of the vehicle 1, and automatically perform steering control and speed control of the vehicle 1 in accordance with the selected travel state. The plurality of travel states have different automation rates from each other. For example, the plurality of travel states can include a travel state in which the driver is required to perform a periphery monitoring duty and a travel state in which the driver is not required to perform the periphery monitoring duty. The travel state in which the driver is required to perform the periphery monitoring duty will be referred to as an "on-duty state". An on-duty state may correspond to level 2 of the automation levels defined by the SAE (Society of Automotive Engineers) International or the NHTSA (National Highway Traffic Safety Administration). The travel state in which the driver is not required to perform the periphery monitoring duty will be referred to as an "off-duty state". An off-duty state may correspond to level 3 of the above-described automation levels. The automation rate of the on-duty state is lower than the automation rate of the off-duty state. The on-duty state may be further subdivided into a travel state in which the driver is required to grip the steering wheel 31 and a travel state in which the driver is not required to grip the steering wheel.

Figure 2:
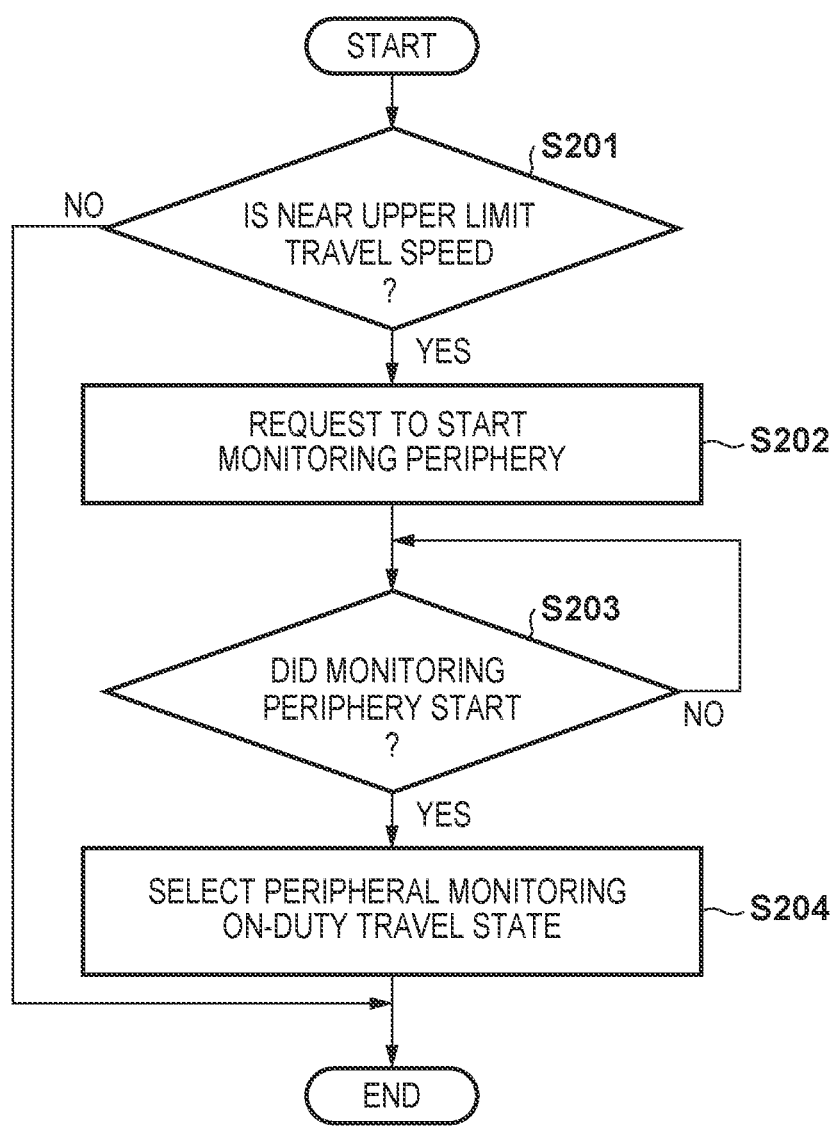
FIG. 2 is a flowchart for explaining an operation example of a control apparatus of the vehicle according to the embodiment.

The operation performed when the control apparatus 2 is to switch the travel state from the off-duty state to the on-duty state will be described with reference to FIG. 2. At the starting point of this operation, the control apparatus 2 is executing automated travel control in the off-duty state. This operation is executed repeatedly while the control apparatus 2 is executing the automated travel control in an off-duty state. This operation may be executed by the processor (for example, the processor 20a) of the control apparatus 2 executing a computer program stored in the memory (for example, the memory 20b) of the control apparatus 2. In this case, the processor of the control apparatus 2 will be the execution subject of each process of the flowchart shown in FIG. 2. Alternatively, some or all of the processes of the flowchart shown in FIG. 2 may be executed by a dedicated processing circuit such as an ASIC (Application Specific Integrated Circuit). In such a case, the dedicated processing circuit will be the execution subject of each process. In a similar manner, the processes of other flowcharts in this specification may be executed by a processor (a general-purpose processing circuit) or a dedicated processing circuit.

In step S201, the control apparatus 2 determines whether the current vehicle speed of the vehicle 1 is near the upper limit travel speed of the off-duty state which is the current selected state. If it is determined that the current vehicle speed of the vehicle 1 is near the upper limit travel speed of the off-duty state (YES in step S201), the control apparatus 2 advances the process to step S202. Otherwise (NO in step S201), the processing ends. In step S202, the control apparatus 2 requests the driver to start monitoring the periphery.

When traveling by automated travel control, the vehicle 1 can travel at a speed that falls within a functional limit speed range. The functional limit speed range is a range of speed that can be functionally output by the vehicle 1 in automated travel control, and is a range that is determined in accordance with the capability of the vehicle 1 regardless of the travel environment of the vehicle 1. The functional limit speed range is for example, 0 kph (0 km per hour) or more to 135 kph or less.

A selectable speed range has been set to each of the plurality of travel states and is stored in the memory (for example, the memory 20b) of the control apparatus 2. Each selectable speed range is a range of speed that can be selected in a corresponding travel state. The selectable speed range is included in the functional limit speed range. For example, in a case in which the travel state is the on-duty state, a normal selectable speed range is 0 kph or more to 100 kph or less. In a case in which the travel state is the off-duty state, a normal selectable speed range is 40 kph or more to 60 kph or less. A normal selectable speed range is a selectable speed range which has been set without being based on the operation by the driver or the information of the driver. The upper limit of the selectable speed range will be referred to as the upper limit travel speed. As will be described later, the control apparatus 2 can change the upper limit travel speed of each travel state based on the operation by the driver and/or the information of the driver. The control apparatus 2 may also change the normal selectable speed range based on the environment of the vehicle 1. For example, if the travel environment of the vehicle 1 is unfavorable (for example, due to an unfavorable field of view, a snowy road, or the like), the control apparatus 2 may make changes to lower the upper limit and/or the lower limit of the normal selectable speed range.

The control apparatus 2 determines a target speed of the vehicle 1 in accordance with the travel environment of the vehicle 1. A target speed is a speed to be maintained by the vehicle 1 in accordance with the travel environment of the vehicle 1. For example, in a case in which the self-vehicle is to follow a preceding vehicle, the control apparatus 2 determines the target speed based on the speed of the preceding vehicle and the target following distance. If a preceding vehicle is not present, the control apparatus 2 determines the target speed so as not to exceed the speed limit indicated on a road sign. If the travel environment is unfavorable (for example, due to an unfavorable field of view, a snowy road, or the like), the target speed may be set lower than the speed limit indicated on the road sign. The target speed is determined so that the target speed will fall within the selectable speed range of one of the travel states. The target speed may also be determined by the driver so that the target setting speed will fall within the selectable speed range of one of the travel states.

For example, assume a case in which the travel state of the vehicle 1 is set to the off-duty state and the vehicle 1 is following a preceding vehicle traveling at 50 kph on a road with a 100 kph speed limit indicated on the road sign. In this case, the control apparatus 2 will set the target speed to 50 kph. The control apparatus 2 will set the target speed to 100 kph after the preceding vehicle has departed, and accelerate the speed of the self-vehicle to reach this set target speed. In this case, since the upper limit travel speed of the off-duty state is 60 kph, a speed which is equal to or higher than this speed cannot be selected if the travel state remains in the off-duty state. Hence, the control apparatus 2 will request the driver to perform periphery monitoring so that the travel state can be switched to the on-duty state which has a higher upper limit travel speed than the off-duty state. When periphery monitoring has been started by the driver, the control apparatus 2 switches the travel state to the on-duty state, and the control apparatus 2 accelerates the vehicle speed so that it will reach the target speed of 100 kph. In this manner, the upper limit travel speed of each travel state is used as a speed threshold for switching the selected travel state into another travel state. Hence, the upper limit travel speed may also be referred to as a speed threshold. If it is determined that the current vehicle speed of the vehicle 1 falls within a predetermined range (for example, the difference between the current vehicle speed and the upper limit travel speed is within 5 kph) from the upper limit travel speed of the off-duly state, the control apparatus 2 may request, in step S202, the driver to start monitoring the periphery.

In step S203, the control apparatus 2 determines whether the driver has started monitoring the periphery. If it is determined that the driver has started monitoring the periphery (YES in step S203), the control apparatus 2 advances the process to step S204, Otherwise (NO in step S203), the process of step S203 is repeated. The control apparatus 2 may determine whether the driver has started monitoring the periphery based on, for example, an image of the driver captured by the camera 44. In step S204, the control apparatus 2 selects the on-duty state (switches the travel state to the on-duty state).

Figure 3:
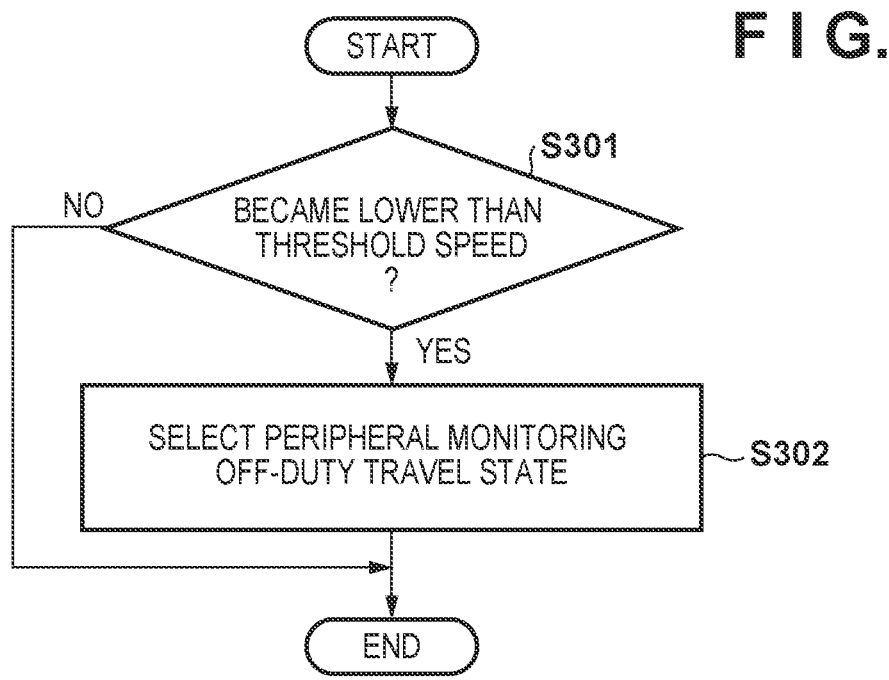
FIG. 3 is a flowchart for explaining an operation example of the control apparatus of the vehicle according to the embodiment.

The operation performed when the control apparatus 2 is to switch the travel state from the on-duty state to the off-duty state will be described with reference to FIG. 3. At the starting point of this operation, the control apparatus 2 will be executing automated travel control in the on-duty state. This operation is repetitively executed while the control apparatus 2 is operating the automated travel control in the on-duty state.

In step S301, the control apparatus 2 determines whether the current vehicle speed of the vehicle 1 has become lower than the threshold speed of the on-duty state. If it is determined that the current vehicle speed of the vehicle 1 has become lower than the threshold speed (YES in step S301), the control apparatus 2 advances the process to step S302. Otherwise (NO in step S301), the processing ends. For example, the current vehicle speed of the vehicle 1 can become lower than the threshold speed of the on-duty state in a case in which congestion has occurred in front of the vehicle 1. In step S302, the control apparatus 2 selects the off-duty state (switches the travel state to the off-duty state). In response to this selection, the control apparatus 2 may notify the driver that the periphery monitoring duly is not required.

The threshold speed used in step S301 may be the upper limit travel speed of the off-duty state. Alternatively, the threshold speed may also be a value which is lower than the upper limit travel speed of the off-duty state. It will be possible to suppress frequent switching between the on-duty state and the off-duty state by selecting a lower value in this manner.

Figure 4:
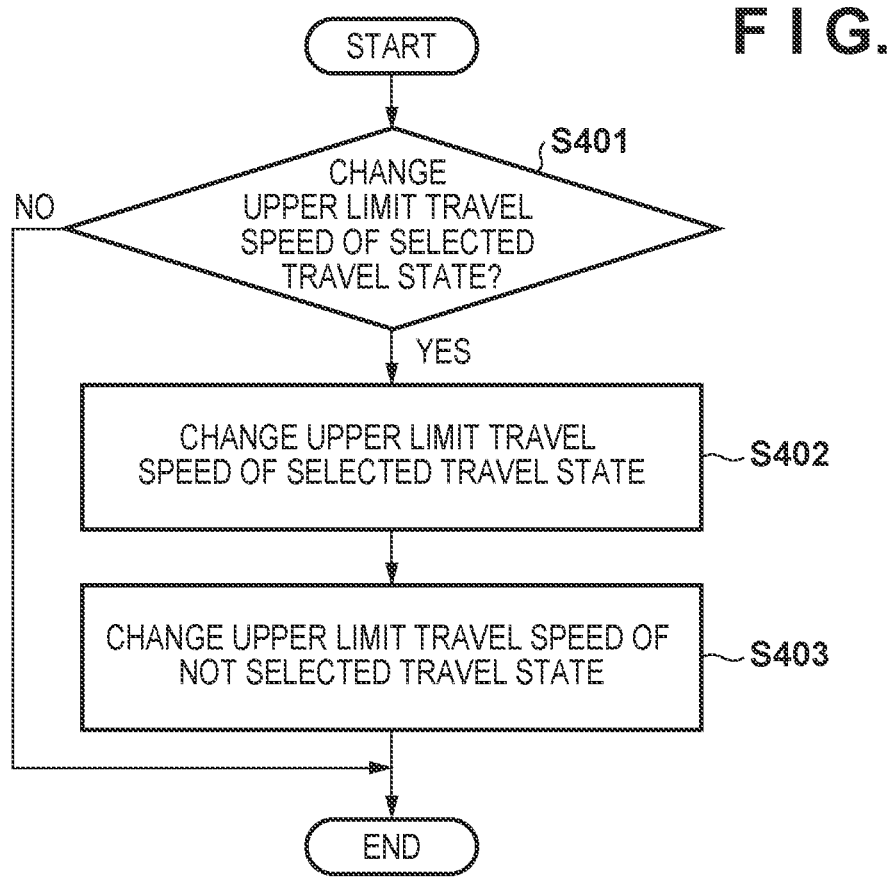
FIG. 4 is a flowchart for explaining an operation example of the control apparatus of the vehicle according to the embodiment.

The upper limit travel speed setting operation performed by the control apparatus 2 will be described with reference to FIG. 4. At the starting point of this operation, the control apparatus 2 is executing automated travel control in one of the travel states. This operation is executed repeatedly while the control apparatus 2 is executing the automated travel control.

In step S401, the control apparatus 2 determines whether the upper limit travel speed of the selected travel state needs to be changed. If it is determined that the upper limit travel speed of the selected travel state needs to be changed (YES in step S401), the control apparatus 2 advances the process to step S402. Otherwise (NO in step S401), the processing ends. In step S402, the control apparatus 2 changes the upper limit travel speed of the selected travel state.

The control apparatus 2 may determine whether the upper limit travel speed of the selected travel state needs to be changed based on the operation of the driver, based on the information of the driver, or a combination of the operation and the information of the driver. As described above, the normal upper limit travel speed of the off-duty state is, for example, 60 kph. Depending on the driver, the driver may feel anxious about traveling at this upper limit travel speed without performing periphery monitoring. Hence, the driver can personally make an operation to reduce the upper limit travel speed of the off-duty state. Also, after reducing the upper limit travel speed, the driver can personally make an operation to increase this value. The driver can also set the upper limit travel speed of the on-duty state in a similar manner.

The driver may use, for example, an operation element (for example, a resume button) for selecting the travel state to set the upper limit travel speed. Alternatively, the driver may use an operation element (for example, the accelerator pedal 7A or the brake pedal 7B) for controlling acceleration/deceleration to set the upper limit travel speed. The control apparatus 2 sets (changes) the upper limit travel speed in accordance with an operation using these operation elements. The control apparatus 2 may also set the upper limit travel speed of the selected travel state based on the operation by the driver and/or the information of the driver so the normal upper limit travel speed will not be exceeded. More specifically, in a case in which the upper limit travel speed to be set by the driver exceeds the normal upper limit travel speed, the control apparatus 2 need not accept such a setting.

The control apparatus 2 can change the upper limit travel speed of the selected travel state by one level per operation. For example, the control apparatus 2 may change the upper limit travel speed by one level (for example, 5 kph) each time a button is pressed once or each time a pedal is pressed once.

Alternatively or in addition to setting the upper limit travel speed by an operation by the driver, the control apparatus 2 may set the upper limit travel speed based on the information of the driver. For example, the control apparatus 2 may set the upper limit travel speed based on the expression and/or posture of the driver. For example, if the driver seems to have an anxious expression and has hunched his/her back, the control apparatus 2 may reduce the upper limit travel speed. On the other hand, if the driver has a calm expression and has kept his/her back straight, the control apparatus 2 may increase the upper limit travel speed.

The control apparatus 2 may also set the upper limit travel speed based on the attributes of the driver. The attributes of the driver may include, for example, the sex and the age of the driver. For example, if the driver is an elderly person or is female (for example, a mother of an infant or a toddler), the control apparatus 2 may reduce the upper limit travel speed. On the other hand, if the driver is not an elderly person or is male, the control apparatus 2 may increase the upper limit travel speed.

In step S403, the control apparatus 2 changes the upper limit travel speed of a travel state that is not currently selected and stores the changed upper limit travel speed in the memory (for example, the memory 20b) of the control apparatus 2. In a case in which the travel state is subsequently changed to this travel state that is not currently selected, the control apparatus 2 will execute the automated travel control based on the changed upper limit travel speed. For example, in a case in which the off-duty state is selected again after the on-duty state was selected after the upper limit travel speed of the off-duty state was set (changed) while the off-duty state was initially selected, the control apparatus 2 may use the upper limit travel speed that was set while the off-duty state was previously selected.

In a case in which the upper limit travel speed of the currently selected travel state is changed based on the driver, it can be assumed that the driver would want the upper limit travel speed of the travel state that is not currently selected to be changed in a similar manner as well. Hence, the control apparatus 2 will change the upper limit travel speed of the travel state that is not currently selected in accordance with the change in the upper limit travel speed of the currently selected travel state. The control apparatus 2 may set the upper limit travel speed of the travel state that is not currently selected so the normal upper limit travel speed will not be exceeded.

A modification of the upper limit travel speed when the on-duty state is selected will be described with reference to FIG. 5. A reference table 500 is a reference table used by the control apparatus 2 to set the upper limit travel speed in the on-duty state. The reference table 500 is stored in advance (for example, before the vehicle 1 is shipped or at the installation of the computer programs) in the memory (for example, the memory 20b) of the control apparatus 2. A reference table 600 of FIG. 6 is also arranged in a similar manner.

A column 501 shows the upper limit travel speed in the currently selected travel state (that is, the on-duty state) changed in the process of step S402. A column 502 shows the upper limit travel speed of the travel state (that is, the off-duty state) which is not currently selected and is to be changed in the process of step S403. For example, assume that the control apparatus 2 has changed the upper limit travel speed of on-duty state from the normal 100 kph to 90 kph. In this case, since the upper limit travel speed of the currently selected travel state has been set so that the speed will be lower than 100 kph as the threshold, the control apparatus 2 will reduce the upper limit travel speed of each travel state which is not currently selected from the normal 60 kph to 50 kph.

A modification of the upper limit travel speed when the off-duty state is selected will be described with reference to FIG. 6. The reference table 600 is a reference table used by the control apparatus 2 to set the upper limit travel speed in the off-duty state. A column 601 shows the upper limit travel speed of the currently selected travel state (that is, the off-duty state) changed in the process of step S402. A column 602 shows the upper limit travel speed of the travel state which is not currently selected and is to be changed in the process of step S403. For example, in a case in which the upper limit travel speed of the off-duty state is changed to 45 kph, the control apparatus 2 will change (set) the upper limit travel speed of the on-duty state to 90 kph.

Figure 7:
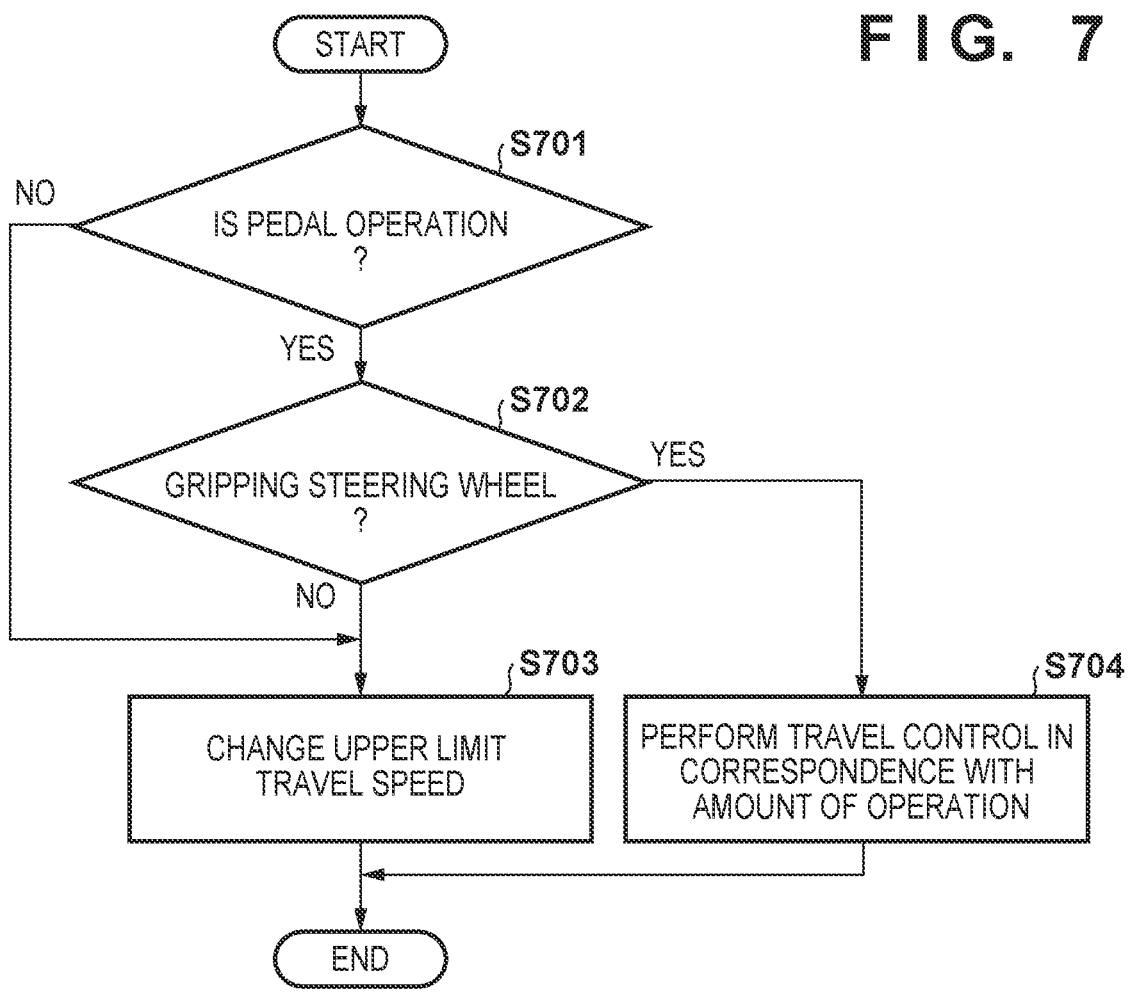
FIG. 7 is a flowchart for explaining an operation example of the control apparatus of the vehicle according to the embodiment.

The operation performed by the control apparatus 2 to set the upper limit travel speed in accordance with the operation of the driver will be described with reference to FIG. 7. At the starting point of this operation, the control apparatus 2 is executing automated travel control in one of the travel states. This operation is executed repeatedly while the control apparatus 2 is executing the automated travel control.

In step S701, the control apparatus 2 determines whether the operation by the driver is an operation on an operation element (for example, the accelerator pedal 7A or the brake pedal 7B) for controlling the acceleration/deceleration. If it is determined that the operation by the driver is an operation on the operation element for controlling the acceleration/deceleration (YES in step S701), the control apparatus 2 advances the process to step S702. Otherwise (NO in step S701), the process advances to step S703. In step S702, the control apparatus 2 determines whether the driver is gripping the steering wheel 31. If it is determined that the driver is gripping the steering wheel 31 (YES in step S702), the control apparatus 2 advances the process to step S704. Otherwise (NO in step S702), the process advances to step S703.

The control apparatus 2 will execute, by the branching of the processes of steps S701 and S702 described above, the process of step S703 in a case in which the operation of the driver is an operation performed on an operation element other than the operation element for controlling the acceleration/deceleration (for example, a case in which the operation is performed on an operation element for selecting the travel state), and in a case in which the operation of the driver is an operation performed on the operation element for controlling the acceleration/deceleration and the driver is not gripping the steering wheel 31. In step S703, the control apparatus 2 changes the upper limit travel speed of the currently selected travel state and the upper limit travel speed of the travel state which is not currently selected in the above-described manner.

The control apparatus 2 will execute, by the branching of the processes of steps S701 and S702 described above, the process of step S704 in a case in which the operation by the driver is the operation performed on the operation element for controlling the acceleration/deceleration and the driver is gripping the steering wheel 31. Since the driver is gripping the steering wheel 31, it can be considered that the driver is intending to perform control by himself herself instead of simply changing the upper limit travel speed. Hence, in step S704, the control apparatus 2 will not change the upper limit travel speed of the travel state, but perform travel control in correspondence with the amount of operation by the driver. In this case, the control apparatus 2 may end the automated travel control and shift to manual driving or may continue the automated travel control by performing travel control which takes into account the amount of operation by the driver.

Figure 8:
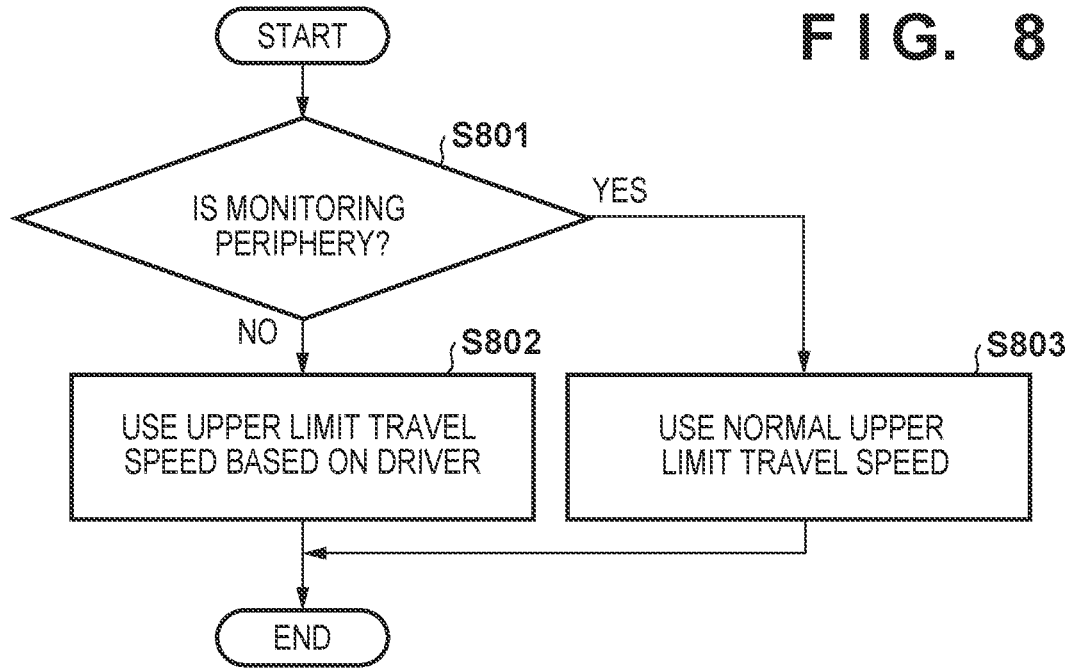
FIG. 8 is a flowchart for explaining an operation example of the control apparatus of the vehicle according to the embodiment.

The operation performed by the control apparatus 2 to select the upper limit travel speed in the off-duty state will be described with reference to FIG. 8. At the starting point of this operation, the control apparatus 2 is executing automated travel control in the off-duty state. This operation is executed repeatedly while the control apparatus 2 is executing the automated travel control in an off-duty state.

In step S801, the control apparatus 2 determines whether the driver is monitoring the periphery. If it is determined that the driver is monitoring the periphery (YES in step S801), the control apparatus 2 advances the process to step S803. Otherwise (NO in step S801), the process advances to step S802.

In step S802, the control apparatus 2 executes travel control by using the upper limit travel speed set based on the operation or information of the driver as described above. On the other hand, in step S803, the driver is monitoring the periphery even though the driver is not required to perform the periphery monitoring duty. Hence, even if the control apparatus 2 performs travel control by using the normal upper limit travel speed value that is not based on the driver) of the off-duty state, it is less likely for the driver to feel anxious about this travel control. Therefore, in step S803, the control apparatus 2 executes travel control by using the normal setting value of the upper limit travel speed of the off-duty state.

In the above-described embodiment, the plurality of travel states include the travel state in which the driver is required to perform the periphery monitoring duty and the travel state in which the driver is not required to perform the periphery monitoring duty. Alternatively, the plurality of travel states may include a travel state in which the driver is required to perform e periphery monitoring duty and the steering wheel gripping duty and a travel state in which the driver is required to perform the periphery monitoring duty, but is not required to perform the steering wheel gripping duty. The automation rate of the travel state in which the driver is required to perform the periphery monitoring duty and the steering wheel gripping duty is lower than the automation rate of the travel state in which the driver is required to perform the periphery monitoring duty, but is not required to perform the steering wheel gripping duty. In this case, the upper limit travel speed of the travel state in which the driver is required to perform the periphery monitoring duty and the steering wheel gripping duty is set to be higher than the upper limit travel speed of the travel state in which the driver is required to perform the periphery monitoring duty, but is not required to perform the steering wheel gripping duly. Hence, in the above-described embodiment, "the travel state in which the driver is required to perform the periphery monitoring duty" may be replaced by "the travel state in which the driver is required to perform the periphery monitoring duty and the steering wheel gripping duty" and "the travel state in which the driver is not required to perform the periphery monitoring duty" may be replaced by "the travel state in which the driver is required to perform the periphery monitoring duly, but is not required to perform the steering wheel gripping duty", and an operation set to the upper limit travel speed corresponding to each travel state will be performed. Furthermore, the plurality of travel states may include the travel state in which the driver is required to perform the periphery monitoring duty, but is not required to perform the steering wheel gripping duty, the travel state in which the driver is required to perform the periphery monitoring duty and the steering wheel gripping duty, and the travel state in which the driver is not required to perform the periphery monitoring duty. In this case, an operation combining the above-described embodiment will be executed.

SUMMARY OF EMBODIMENT

<Item 1>
A control apparatus (2) of a vehicle (1), the apparatus comprising:
a selection unit (S204, S302) configured to select one of a plurality of travel states which have different automation rates from each other;
a storage unit (20h) configured to store an upper limit travel speed of each of the plurality of travel states; and
a changing unit (S402) configured to change, based on at least one of an operation by a driver and/or information of the driver, an upper limit travel speed of a travel state which is currently selected by the selection unit,
wherein the changing unit (S403) changes, in accordance with the change in the upper limit travel speed of the travel state which is currently selected, an upper limit travel speed of a travel state which is not currently selected among the plurality of travel states.
According to this item, the anxiety felt by the driver of a vehicle during automated travel is reduced.
<Item 2>
The control apparatus according to item 1, wherein the plurality of travel states include a first travel state in which steering control and speed control of the vehicle are automatically performed and a second travel state in which an automation rate is lower than an automation rate of the first travel state, and
in a case in which the changing unit has changed an upper limit travel speed of the first travel state to be lower than a threshold, the changing unit reduces an upper limit travel speed of the second travel state (500).
According to this item, the upper limit travel speed of a travel state with a low automation rate is set in accordance with the upper limit travel speed of a travel state with a high automation rate.

<Item 3>
The control apparatus according to item 2, wherein the upper limit travel speed of the first travel state indicates a speed for switching the first travel state to the second travel state.
According to this item, the travel state is switched based on the upper limit travel speed.
<Item 4>
The control apparatus according to item 2 or 3, wherein the upper limit travel speed of the first travel state is lower than the upper limit travel speed of the second travel state.
According to this item, the upper limit travel speed of the travel state with the high automation rate is reduced.
<Item 5>
The control apparatus according to one of items 1 to 4, wherein the control apparatus determines, based on whether the driver is performing periphery monitoring of the outside of the vehicle, whether to use an upper limit travel speed which has been changed based on at least one of the operation by the driver and/or the information of the driver (S801).
According to this item, the upper limit travel speed can be selected appropriately based on the state of monitoring by the driver.
<Item 6>
The control apparatus according to any one of items 1 to 5, wherein the changing unit changes the upper limit travel speed of the travel state which is currently selected by one level per operation by the driver.
According to this item, the upper limit travel speed can be set accurately.
<Item 7>
The control apparatus according to any one of items 1 to 6, wherein in a case in which the driver has performed an operation using an operation element for controlling the acceleration/deceleration of the vehicle and the driver is not gripping the steering wheel of the vehicle, the changing unit changes the upper limit travel speed of the travel state which is currently selected (S703).
According to this item, the upper limit travel speed can be set by appropriately grasping the driver's intention.
<Item 8>
The control apparatus according to any one of items 1 to 7, wherein in a case in which the driver has performed an operation using an operation element for controlling the acceleration/deceleration of the vehicle and the driver is gripping the steering wheel of the vehicle, the changing unit does not change the upper limit travel speed of the travel state which is currently selected, and the control apparatus performs travel control corresponding to an amount of operation performed by the driver (S704).
According to this item, travel control can be executed by appropriately grasping the driver's intention.
<Item 9>
A control apparatus (2) of a vehicle (1), the apparatus comprising:
a selection unit (S204, S302) configured to select a travel state from a plurality of travel states based on external environment information;
a switching unit (S204, S302) configured to switch a travel state which is currently selected by the selection unit to another travel state; and
a setting unit (S402, S403) configured to set, based on at least one of an operation by the driver and/or information of the driver, a speed threshold for switching the travel state which is currently selected to the other travel state, wherein in a case in which a speed threshold of a second travel state which is currently selected is to be set lower than a normal speed threshold of the second travel state (S402), the setting unit sets a speed threshold of a first travel state Which is not currently selected to be lower than a normal speed threshold of the first travel state (S403).

According to this item, the anxiety felt by the driver of a vehicle during automated travel is reduced.

<Item 10>

The control apparatus according to item 9, wherein the normal speed threshold is a speed threshold which is set without being based on any of the operation by the driver and the information of the driver.

According to this item, the speed threshold based on at least one of the operation by the driver and/or the information of the driver can be set lower than the speed threshold set without being based on one of the operation by the driver and the information of the driver.

<Item 11>

The control apparatus according to item 10, wherein the setting unit changes the normal speed threshold based on an environment of the vehicle.

According to this item, the speed threshold can be changed without being based on one of the operation by the driver and the information of the driver.

<Item 12>

The control apparatus according to any one of items 9 to 11, wherein in a case in which the second travel state is selected after the speed threshold has been set while the first travel state is selected and the first travel state is subsequently further selected after the second travel state, the setting unit uses the speed threshold set while the first travel state was previously selected.

According to this item, a previously set speed threshold can be used again.

<Item 13>

The control apparatus according to any one of items 1 to 12, wherein the operation by the driver includes at least one of an operation using an operation element for selecting the travel state, and/or an operation using an operation element (7A, 7B) for controlling the acceleration/deceleration.

According to this item, the upper limit travel speed can be set by the operation by the driver.

<Item 14>

The control apparatus according to any one of items 1 to 13, wherein the information of the driver includes at least one of an expression and/or a posture of the driver.

According to this item, the upper limit travel speed can be set depending on the driver's expression or posture without depending on the operation by the driver.

<Item 15>

The control apparatus according to any one of items 1 to 14, wherein the information of the driver includes an attribute of the driver.

According to this item, the upper limit travel speed can be set based on the attribute of the driver without depending on the operation by the driver.

<Item 16>

A vehicle (1) comprising a control apparatus (2) according to any one of items 1 to 15.

According to this item, the above-described items are provided in the form of a vehicle.

<Item 17>

A computer program for causing a computer to operate as each unit of a control apparatus (2) according to any one of items 1 to 15.

According to this item, the above-described items are provided in the form of a computer program.

<Item 18>

A method of controlling a vehicle (1) that includes a storage unit (20b) configured to store an upper limit travel speed of each of a plurality of travel states which have different automation rates from each other, the method comprising:

selecting one of the plurality of travel states (S204, S302);

changing, based on at least one of an operation by a driver and/or information of the driver, an upper limit travel speed of a travel state which is currently selected (S402); and changing, in accordance with the change in the upper limit travel speed of the travel state which is currently selected, an upper limit travel speed of a travel state which is not currently selected among the plurality of travel states (S403).

According to this item, the anxiety felt by the driver of a vehicle during automated travel is reduced, <Item 19>

A method of controlling a vehicle (1), the method comprising:

selecting a travel state from a plurality of travel states based on external environment information (S204, S302);

switching a travel state which is currently selected to another travel state (S204, S302); and setting, based on at least one of an operation by the driver and/or information of the driver, a speed threshold for switching the travel state which is currently selected to the other travel state (S402, S403), wherein in a case in which a speed threshold of a second travel state which is currently selected is to be set lower than a normal speed threshold of the second travel state (S402), a speed threshold of a first travel state which is not currently selected is set to be lower than a normal speed threshold of the first travel state (S403).

According to this item, the anxiety felt by the driver of a vehicle during automated travel is reduced.

The invention is not limited to the foregoing embodiments, and various variations/changes are possible within the spirit of the invention.

What is claimed is:

1. A control apparatus of a vehicle, the apparatus comprising:

a selection unit configured to select one of a plurality of travel states which have different automation rates from each other;

a storage unit configured to store an upper limit travel speed of each of the plurality of travel states; and a changing unit configured to change, based on at least one of an operation by a driver and/or information of the driver, an upper limit travel speed of a travel state which is currently selected by the selection unit, wherein the changing unit changes, in accordance with the change in the upper limit travel speed of the travel state which is currently selected, an upper limit travel speed of a travel state which is not currently selected among the plurality of travel states.

2. The apparatus according to claim 1, wherein the plurality of travel states include a first travel state in which steering control and speed control of the vehicle are automatically performed and a second travel state in which an automation rate is lower than an automation rate of the first travel state, and in a case in which the changing unit has changed an upper limit travel speed of the first travel state to be lower than a threshold, the changing unit reduces an upper limit travel speed of the second travel state.

3. The apparatus according to claim 2, wherein the upper limit travel speed of the first travel state indicates a speed for switching the first travel state to the second travel state.

4. The apparatus according to claim 2, wherein the upper limit travel speed of the first travel state is lower than the upper limit travel speed of the second travel state.

5. The apparatus according to claim 1, wherein the control apparatus determines, based on whether the driver is performing periphery monitoring of the outside of the vehicle, whether to use an upper limit travel speed which has been changed based on at least one of the operation by the driver and/or the information of the driver.

6. The apparatus according to claim 1, wherein the changing unit changes the upper limit travel speed of the travel state which is currently selected by one level per operation by the driver.

7. The apparatus according to claim 1, wherein in a case in which the driver has performed an operation using an operation element for controlling the acceleration/deceleration of the vehicle and the driver is not gripping the steering wheel of the vehicle, the changing unit changes the upper limit travel speed of the travel state which is currently selected.

8. The apparatus according to claim 1, wherein in a case in which the driver has performed an operation using an operation element for controlling the acceleration/deceleration of the vehicle and the driver is gripping the steering wheel of the vehicle, the changing unit does not change the upper limit travel speed of the travel state which is currently selected, and the control apparatus performs travel control corresponding to an amount of operation performed by the driver.

9. The apparatus according to claim 1, wherein the operation by the driver includes at least one of an operation using an operation element for selecting the travel state, and/or an operation using an operation element for controlling the acceleration/deceleration.

10. The apparatus according to claim 1, wherein the information of the driver includes at least one of an expression and/or a posture of the driver.

11. The apparatus according to claim 1, wherein the information of the driver includes an attribute of the driver.

12. A vehicle comprising a control apparatus according to claim 1.

13. A non-transitory storage medium storing a computer program for causing a computer to operate as each unit of a control apparatus according to claim 1.

14. A control apparatus of a vehicle, the apparatus comprising:
a selection unit configured to select a travel state from a plurality of travel states based on external environment information;
a switching unit configured to switch a travel state which is currently selected by the selection unit to another travel state; and
a setting unit configured to set, based on at least one of an operation by the driver and/or information of the driver, a speed threshold for switching the travel state which is currently selected to the other travel state,
wherein in a case in which a speed threshold of a second travel state which is currently selected is to be set lower than a normal speed threshold of the second travel state, the setting unit sets a speed threshold of a first travel state which is not currently selected to be lower than a normal speed threshold of the first travel state.

15. The apparatus according to claim 14, wherein the normal speed threshold is a speed threshold which is set without being based on any of the operation by the driver and the information of the driver.

16. The apparatus according to claim 15, wherein the setting unit changes the normal speed threshold based on an environment of the vehicle.

17. The apparatus according to claim 14, wherein in a case in which the second travel state is selected after the speed threshold has been set while the first travel state is selected and the first travel state is subsequently further selected after the second travel state, the setting unit uses the speed threshold set while the first travel state was previously selected.

18. A method of controlling a vehicle that includes a storage unit configured to store an upper limit travel speed of each of a plurality of travel states which have different automation rates from each other, the method comprising:
selecting one of the plurality of travel states;
changing, based on at least one of an operation by a driver and/or information of the driver, an upper limit travel speed of a travel state which is currently selected; and
changing, in accordance with the change in the upper limit travel speed of the travel state which is currently selected, an upper limit travel speed of a travel state which is not currently selected among the plurality of travel states.

19. A method of controlling a vehicle, the method comprising:
selecting a travel state from a plurality of travel states based on external environment information;
switching a travel state v which is currently selected to another travel state; and
setting, based on at least one of an operation by the driver and/or information of the driver, a speed threshold for switching the travel state which is currently selected to the other travel state,
wherein in a case in which a speed threshold of a second travel state which is currently selected is to be set lower than a normal speed threshold of the second travel state, a speed threshold of a first travel state which is not currently selected is set to be lower than a normal speed threshold of the first travel state.

\* \* \* \* \*